United States Patent
Lucas et al.

(10) Patent No.: US 10,028,062 B2
(45) Date of Patent: Jul. 17, 2018

(54) DRIVING PLURAL ARMATURES WITH A COMMON STATOR

(71) Applicant: Bose Corporation, Framingham, MA (US)

(72) Inventors: Brian M. Lucas, Marblehead, MA (US); Johan H. Isaksson, Malmo (SE); Geoffrey C. Chick, Norfolk, MA (US)

(73) Assignee: Bose Corporation, Framingham, MA (US)

( * ) Notice: Subject to any disclaimer, the term of this patent is extended or adjusted under 35 U.S.C. 154(b) by 429 days.

(21) Appl. No.: 13/832,699

(22) Filed: Mar. 15, 2013

(65) Prior Publication Data

US 2014/0270328 A1     Sep. 18, 2014

(51) Int. Cl.
| | |
|---|---|
| H04R 25/00 | (2006.01) |
| H04R 11/02 | (2006.01) |
| H04R 9/02 | (2006.01) |
| H04R 9/04 | (2006.01) |
| H02K 41/035 | (2006.01) |
| H02K 16/00 | (2006.01) |

(52) U.S. Cl.
CPC ......... *H04R 11/02* (2013.01); *H02K 41/0356* (2013.01); *H04R 9/027* (2013.01); *H04R 9/04* (2013.01); *H02K 16/00* (2013.01); *H04R 2400/07* (2013.01)

(58) Field of Classification Search
USPC ................................ 381/417, 418, 398, 431
See application file for complete search history.

(56) References Cited

U.S. PATENT DOCUMENTS

| | | |
|---|---|---|
| 1,823,512 A | 9/1931 | Ringel |
| 1,973,277 A | 9/1934 | Barfield |
| 2,035,104 A | 3/1936 | Thomas |
| 2,078,469 A | 4/1937 | Thomas |
| 2,245,511 A | 6/1941 | Turnbull |
| 3,777,078 A | 12/1973 | Boutros-Attia et al. |
| 3,836,733 A | 9/1974 | Cragg |
| 3,937,904 A | 2/1976 | Parker |
| 4,626,717 A | 12/1986 | Hensing et al. |
| 5,216,723 A | 6/1993 | Froeschle et al. |

(Continued)

FOREIGN PATENT DOCUMENTS

| | | |
|---|---|---|
| CN | 203015064 U | 6/2013 |
| CN | 203193871 U | 9/2013 |

(Continued)

OTHER PUBLICATIONS

International Search Report and Written Opinion dated Aug. 4, 2014 for International application No. PCT/US2014/021559.

(Continued)

*Primary Examiner* — Davetta W Goins
*Assistant Examiner* — Phylesha Dabney

(57) ABSTRACT

An apparatus includes at least one load and a plurality of armatures, each including a permanent magnet, which are coupled to the at least one load to cause the at least one load to move. The apparatus also includes a common stator that defines an air gap within which the plurality of armatures is disposed. The common stator is configured for creating magnetic flux across the air gap for the armatures to interact with, thereby to drive motion of the at least one load.

24 Claims, 20 Drawing Sheets

(56) References Cited

U.S. PATENT DOCUMENTS

| | | | |
|---|---|---|---|
| 5,802,189 A | 9/1998 | Blodget | |
| 6,405,599 B1 | 6/2002 | Patt | |
| 6,415,037 B1 | 7/2002 | Wang | |
| 7,247,957 B2 | 7/2007 | Dadd | |
| 8,139,813 B2 * | 3/2012 | Kobayashi et al. | 381/398 |
| 2008/0247595 A1 | 10/2008 | Henry | |
| 2011/0243365 A1 | 10/2011 | Carlmark et al. | |
| 2011/0243366 A1 | 10/2011 | Carlmark et al. | |
| 2012/0106772 A1 | 5/2012 | Horigome et al. | |
| 2012/0248899 A1 | 10/2012 | Oommen et al. | |
| 2014/0064539 A1 | 3/2014 | Link et al. | |
| 2014/0270328 A1 | 9/2014 | Lucas et al. | |
| 2014/0334662 A1 | 11/2014 | Lin | |

FOREIGN PATENT DOCUMENTS

| | | |
|---|---|---|
| GB | 212648 A | 3/1924 |
| GB | 1124830 A | 8/1968 |
| JP | S6212300 | 1/1987 |
| JP | 2009225091 A | 10/2009 |

OTHER PUBLICATIONS

International Search Report and Written Opinion dated Aug. 4, 2014 for International application No. PCT/US2014/021592.
International Search Report and Written Opinion dated Jun. 2, 2015 for International application No. PCT/U52015/018279.
International Search Report and Written Opinion dated May 26, 2015 for International application No. PCT/US2015/018699.
International Search Report and Written Opinion dated May 20, 2015 for International application No. PCT/US2015/018702.
International Search Report and Written Opinion dated May 29, 2015 for International application No. PCT/US2015/018714.
http://bushingsinc.com/index.php/bushings-inc-products-lines/rubber-flex-bushings; retrieved 2007.

* cited by examiner

DRIVING PLURAL ARMATURES WITH A COMMON STATOR

BACKGROUND

This disclosure relates to moving magnet motors, and more particularly to apparatus (e.g., a loudspeaker) in which a single, common stator is employed for driving plural armatures, which, in turn, drive a mechanical load.

SUMMARY

This disclosure is based, in part, on the realization that a moving magnet motor can utilize a single, common stator for driving plural armatures. Such a moving magnet motor can advantageously be employed in an apparatus, such as a loudspeaker, for driving a mechanical load, such as an acoustic diaphragm.

In one aspect, an apparatus includes at least one load and a plurality of armatures, each including a permanent magnet, which are coupled to the at least one load to cause the at least one load to move. The apparatus also includes a common stator that defines an air gap within which the plurality of armatures is disposed. The common stator is configured for creating magnetic flux across the air gap for the armatures to interact with, thereby to drive motion of the at least one load.

Implementations can include one or more of the following figures.

In some implementations, the stator includes at least one core of high magnetic permeability material defining at least one air gap within which the armatures reside. A pair of coils are wrapped around the at least one core for carrying current to generate magnetic flux across the at least one air gap for the armatures to interact with.

In certain implementations, the stator includes a pair of cores of high magnetic permeability material, the cores together defining the air gap. The stator also includes a pair of coils. Each of the coils is wrapped around one of the cores for carrying current to generate magnetic flux across the air gap.

In some implementations, the stator comprises no more than two coils.

In certain implementations, the coils collectively include no more than four end turns.

In some implementations, the plurality of armatures are configured to pivot about respective pivot axes.

In certain implementations, the plurality of armatures are configured to move in a linear motion.

In some implementations, the apparatus includes a pair of levers which couple the armatures to the at least one load for transmitting rotational motion of the armatures to the at least one load to cause the at least one load to move.

In certain implementations, the levers are configured and arranged for rotation in opposite directions of rotation relative to each other.

In some implementations, the levers are arranged to move the at least one load in a pistonic motion.

In certain implementations, the apparatus is a loudspeaker.

In some implementations, the at least one load includes an acoustic diaphragm.

In certain implementations, the apparatus includes an enclosure and a surround that connects the acoustic diaphragm to the enclosure. A bottom wall of the enclosure includes a recess that is arranged and configured to accommodate downward motion of the armatures.

In some implementations, the stator is mounted to the bottom wall of the enclosure.

In certain implementations, the acoustic diaphragm is displaceable between a fully extended position in which the acoustic diaphragm extends outwardly away from the enclosure, and a fully retracted position, in which the acoustic diaphragm is drawn inward towards enclosure. In the fully retracted position, a lower edge of the acoustic diaphragm overlaps at least a portion of the armatures such that the armatures are at least partially tucked into the acoustic diaphragm.

In some implementations, the armatures and the stator are positioned adjacent to and completely within the footprint of the acoustic diaphragm.

In certain implementations, the armatures are configured to move relative to each other.

Another implementation features a method that includes passing electrical current through coils of a common stator to generate magnetic flux across an air gap which a plurality armatures interact with causing the armatures to move, and thereby driving motion of at least one load coupled to the plurality of armatures. Each of the armatures includes a permanent magnet, disposed within the air gap, which interacts with the magnetic flux.

Implementations may include any of the above features and/or the following.

In some implementations, driving motion of the at least one load includes driving motion of an acoustic diaphragm.

In certain implementations, driving motion of the at least one load includes driving the at least one load in a pistonic motion.

In some implementations, driving motion of the at least one load includes driving the plurality of armatures such that the armatures move relative to each other.

In certain implementations, driving motion of the at least one load includes driving oscillatory, arcuate motion of a pair of levers.

In some implementations, driving oscillatory, arcuate motion of the pair of levers includes driving the levers in opposite directions of rotation relative to each other.

In another aspect, a loudspeaker includes an acoustic diaphragm, a first armature, and a first lever mechanically coupling the first armature and the acoustic diaphragm and configured such that motion of the first armature causes the first lever to pivot about a first pivot axis. The loudspeaker also includes a second armature and a second lever mechanically coupling the second armature and the acoustic diaphragm and configured such that motion of the second armature causes the second lever to pivot about a second pivot axis. A common stator is provided for creating magnetic flux for the first and second armatures to interact with, thereby to drive motion of the at least one load.

Implementations may include any of the above features and/or the following.

In certain implementations, the common stator defines an air gap within which the first and second armatures are disposed, and the stator is configured to create magnetic flux across the air gap for the first and second armatures to interact with.

In some implementations, the common stator defines a first air gap within which the first armature is disposed, and a second air gap within which the second armature is disposed. The stator is configured to create magnetic flux across the first and second air gaps for the first and second armatures, respectively, to interact with.

In certain implementations, the levers are configured and arranged for rotation in opposite directions of rotation relative to each other.

In some implementations, the levers are arranged to move the load in a pistonic motion.

In certain implementations, the first and second levers are configured as first class levers.

In some implementations, the first and second levers are configured as second class levers.

Implementations can provide one or more of the following advantages.

In some Implementations, the use of a single, common stator for driving multiple armatures can help to reduce the number of parts in an apparatus. Such a reduction in parts can provide packaging and manufacturing benefits. For example, a reduction in the number of parts can lead to a corresponding reduction in manufacturing steps with less parts requiring assembly. A reduction in parts can also help reduce or free up packaging space, thereby possibly reducing overall package size and/or freeing up space for other component parts.

In certain implementations, the use of a single, common stator for driving multiple armatures can offer overall lower electrical resistance, e.g., as compared to multi-stator arrangements.

In some implementations, the use of a single, common stator for driving multiple armatures can offer better magnetic performance relative to input power, e.g., as compared to multi-stator arrangements.

Other aspects, features, and advantages are in the description, drawings, and claims.

DETAILED DESCRIPTION

Figure 1A:
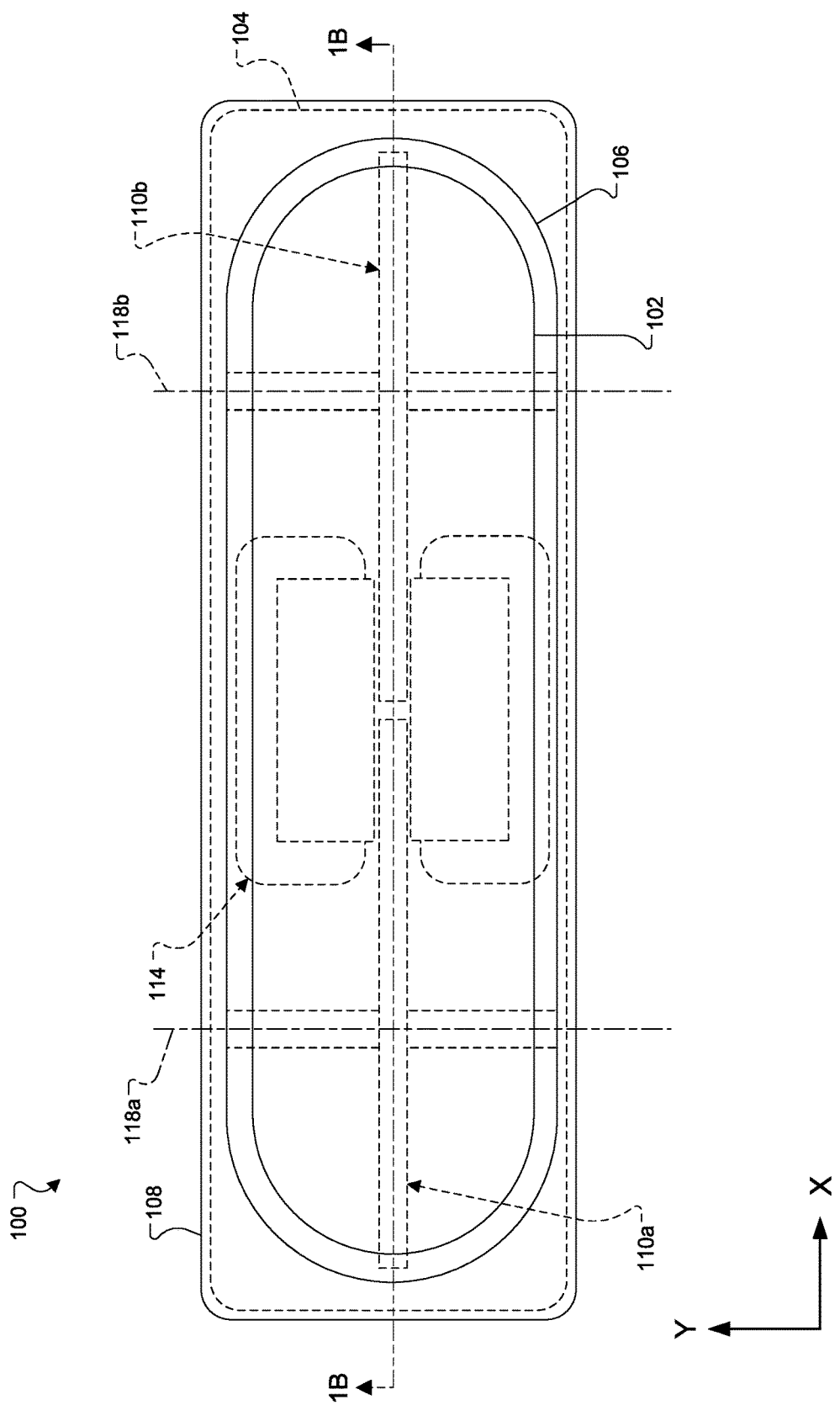
FIG. 1A is a top plan view of a loudspeaker that employs a moving magnet motor which includes a single, common stator for driving a pair of armatures, which in turn drive an acoustic diaphragm.
Figure 1B:
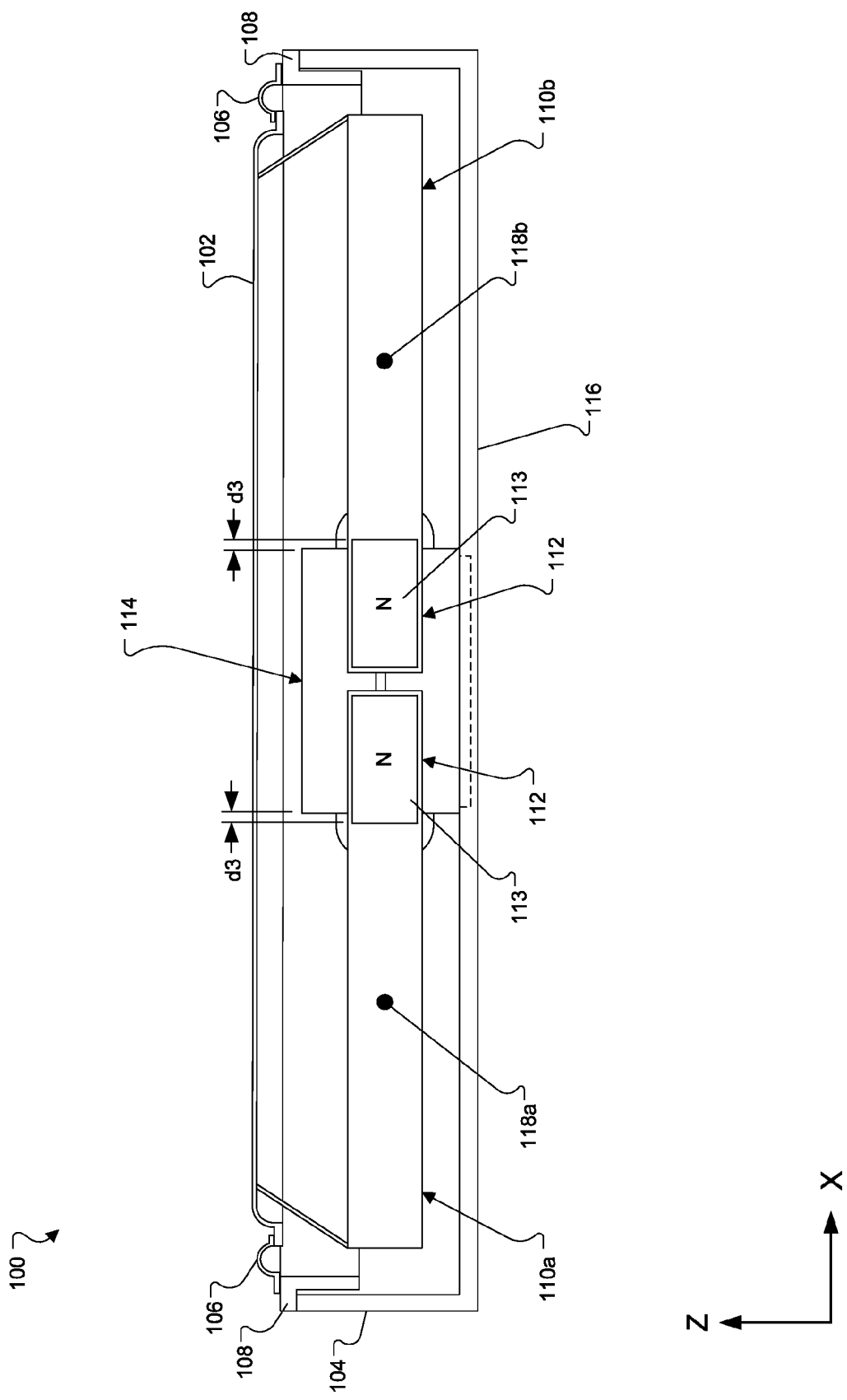
FIG. 1B is a cross-sectional side view of the loudspeaker of FIG. 1A, taken along line 1B-1B.

Referring to FIGS. 1A and 1B, an apparatus, in this example a loudspeaker 100, includes a mechanical load, in this example an acoustic diaphragm 102 (e.g., a cone type speaker diaphragm, also known simply as a "cone"), that is mounted to an enclosure 104, which may be metal, plastic, or other suitable material, by a surround 106, which functions as a pneumatic seal and as a suspension element. For example, in some instances the surround 106 is mounted to a frame 108 and the frame 108 is connected to the enclosure 104. The loudspeaker 100 also includes a pair of levers (i.e., first and second levers 110a, 110b) each of which couple an associated armature 112 to the acoustic diaphragm 102 for transmitting motion of the armatures 112 to the acoustic diaphragm to cause the acoustic diaphragm 102 to move, relative to the enclosure 104.

Each of the armatures 112 includes a permanent magnet 113. Notably, both of the armatures 112 are driven by a single, common stator 114, which provides a magnetic flux for the permanent magnets 113 of both of the armatures 112 to interact with, thereby to drive motion of the acoustic diaphragm. In the illustrated example, the stator 114 is secured to a bottom wall 116 of the enclosure 104 (e.g., with an adhesive). Alternatively or additionally, the stator 114 could be affixed to the frame 108.

Each of the levers 110a, 110b is pivotally connected to a mechanical ground reference, such as the enclosure 104 or the frame 108 of the loudspeaker 100 such that the levers 110a, 110b move in an arcuate path about respective pivot axes 118a, 118b.

The armatures 112 and the stator 114 are positioned beneath the acoustic diaphragm 102 with the pivot axes 118a, 118b being arranged outboard of the armatures 112. That is, the armatures 112 are disposed between the pivot axis 118a of the first lever 110a and the pivot axis 118b of the second lever 110b. The armatures 112 and the stator 114 are between the acoustic diaphragm 102 and the bottom wall 116 of the enclosure 104, and substantially within the footprint of the acoustic diaphragm 102, as defined by the outer peripheral edge of the acoustic diaphragm 102. In some cases, this arrangement can be beneficial, from a packaging perspective, compared to arrangements in which moving magnet motors are arranged alongside the outer perimeter of the acoustic diaphragm 102.

Figure 2A:
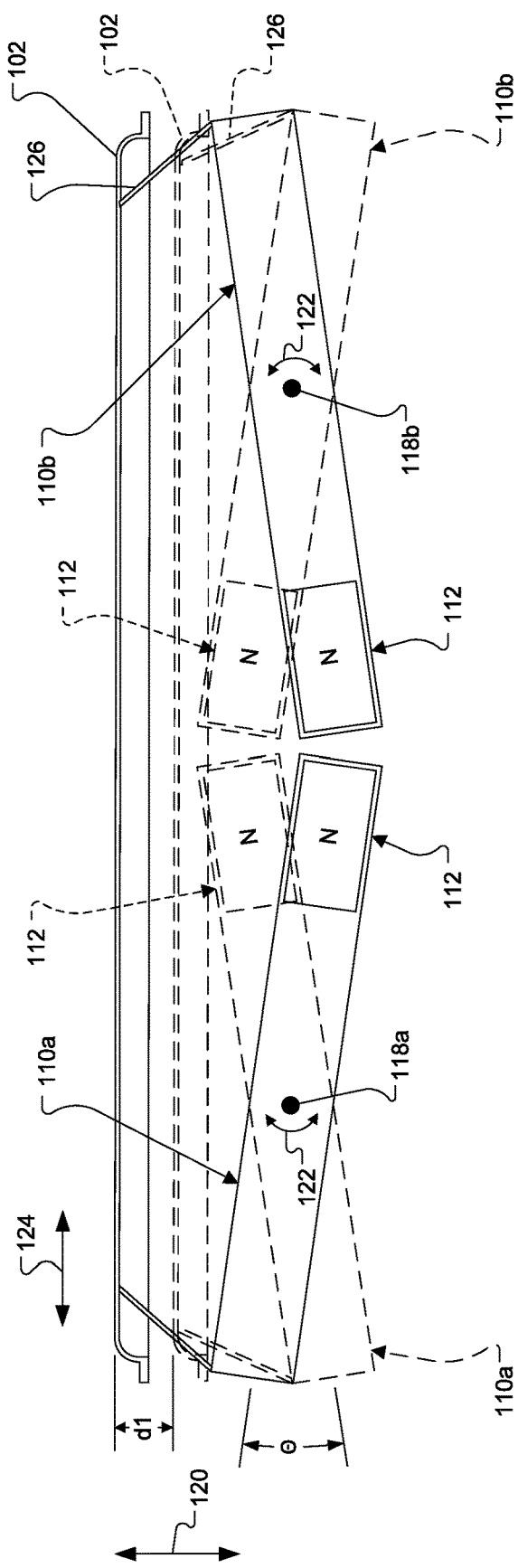
FIG. 2A illustrates oscillatory, arcuate movement of the armatures and pistonic movement of an acoustic diaphragm of the loudspeaker of FIG. 1A.
Figure 2B:
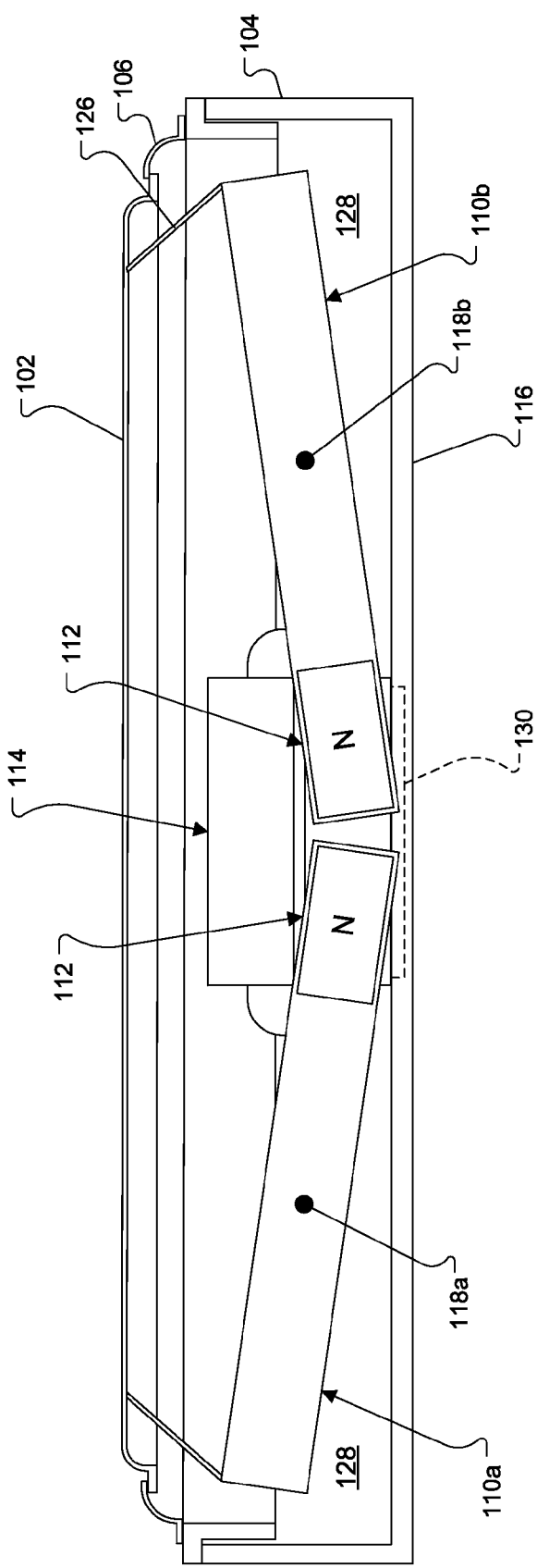
FIGS. 2B and 2C are cross-sectional side views of the loudspeaker of FIG. 1A showing the acoustic diaphragm in a fully extended position and a fully retracted position, respectively.
Figure 2C:
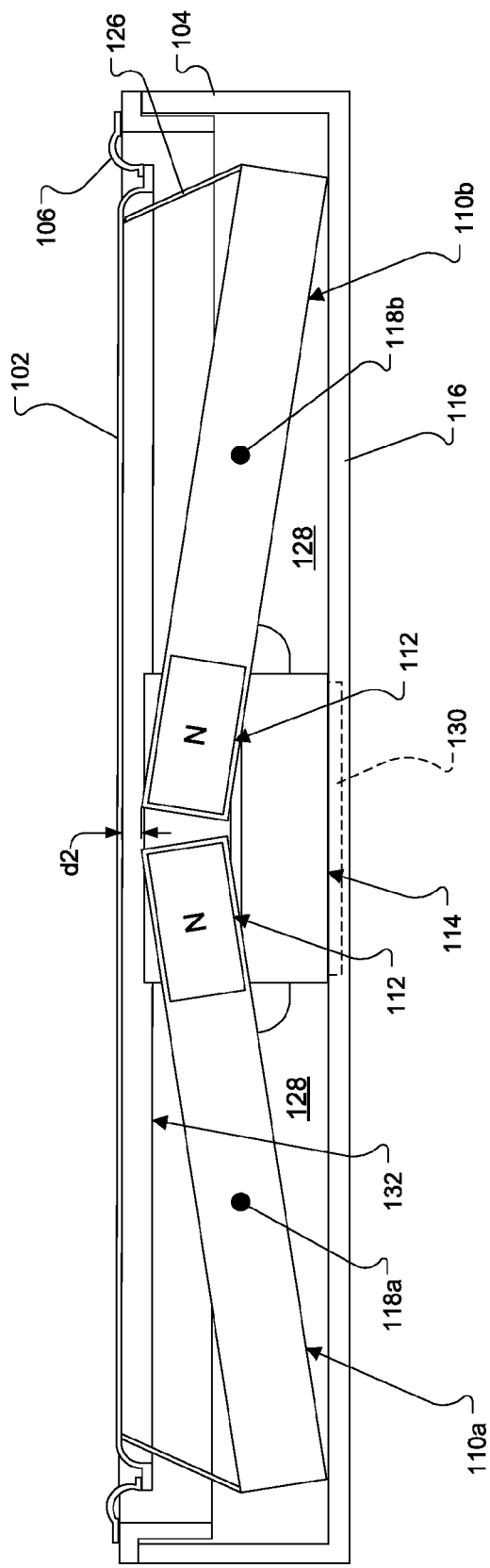

Referring now to FIGS. 2A through 2C, the levers 110a, 110b, in combination with the interaction between the armatures 112 and the stator 114 (not shown in FIG. 2A), move the acoustic diaphragm 102 in a pistonic motion (as indicated by arrow 120, FIG. 2A). For very small motion (e.g., rotation (arrows 122, FIG. 2A) of the levers 110a, 110b over a very small angle θ (e.g., less than 0.1 radians), there is negligible relative lateral motion (arrow 124, FIG. 2A) between the acoustic diaphragm 102 and the connection points of the levers 110a, 110b to the acoustic diaphragm 102. Thus, for configurations in which only slight rotation of the levers 110a, 110b is required to achieve maximum excursion of the acoustic diaphragm 102, connectors 126 that connect the levers 110a, 110b to the acoustic diaphragm 102 may be implemented as simple hinges that merely allow for relative rotation, with little or no relative lateral movement.

As the angle of rotation θ of the levers 110a, 110b increases so does the relative lateral movement between the acoustic diaphragm 102 and the connection points of the levers 110a, 110b to the acoustic diaphragm 102. To accommodate such motion, connectors 126 which allow for at least two-degrees of movement (i.e., relative rotational movement and relative lateral movement) can be used to connect the levers 110a, 110b to the acoustic diaphragm 102. In this regard, each connector 126 can be implemented as a linkage with a hinge on each end, a flexure (such as a metal strip), an elastomeric connection (such as a block of elastomer), or some combination thereof. The levers 110a, 110b drive the acoustic diaphragm 102 between a fully extended position (see FIG. 2B), in which the acoustic diaphragm 102 extends outwardly away from the enclosure 104, and a fully retracted position (see FIG. 2C), in which the acoustic diaphragm 102 is drawn inward toward a chamber 128 of the enclosure 104. The total, peak-to-peak excursion distance (d1) can be designed to be anything over a wide range (e.g., about 1 mm to about 30 mm (e.g., 4 mm)) and can be somewhat dependent on transducer size constraints, and the angle of rotation θ is about 2 degrees to about 20 degrees (e.g., 6 degrees)

In the fully extended position (FIG. 2B), the armatures 112 are rotated downward toward the bottom wall 116 of the enclosure 104. In some cases, the armatures 112 may extend beyond the profile of the stator 114 when the acoustic diaphragm 102 is in its fully extended position. To accommodate this motion of the armatures 112, a recess 130 may be provided in the bottom wall 116 of the enclosure 104 to afford greater clearance.

In the fully retracted position (FIG. 2C), the armatures 112 rotate upwards towards the acoustic diaphragm 102. In some cases, the clearance (d2) between the armatures 112 and the acoustic diaphragm 102 is less than 1 mm (e.g., within 0.5 mm) in the fully retracted position. In some cases, the armatures 112 at least partially tuck underneath the acoustic diaphragm 102 such that the lower edge 132 of the acoustic diaphragm 102 extends below the highest portion of the armatures 112 in the retracted position. This can allow for a better utilization of the available volume.

Figure 3:
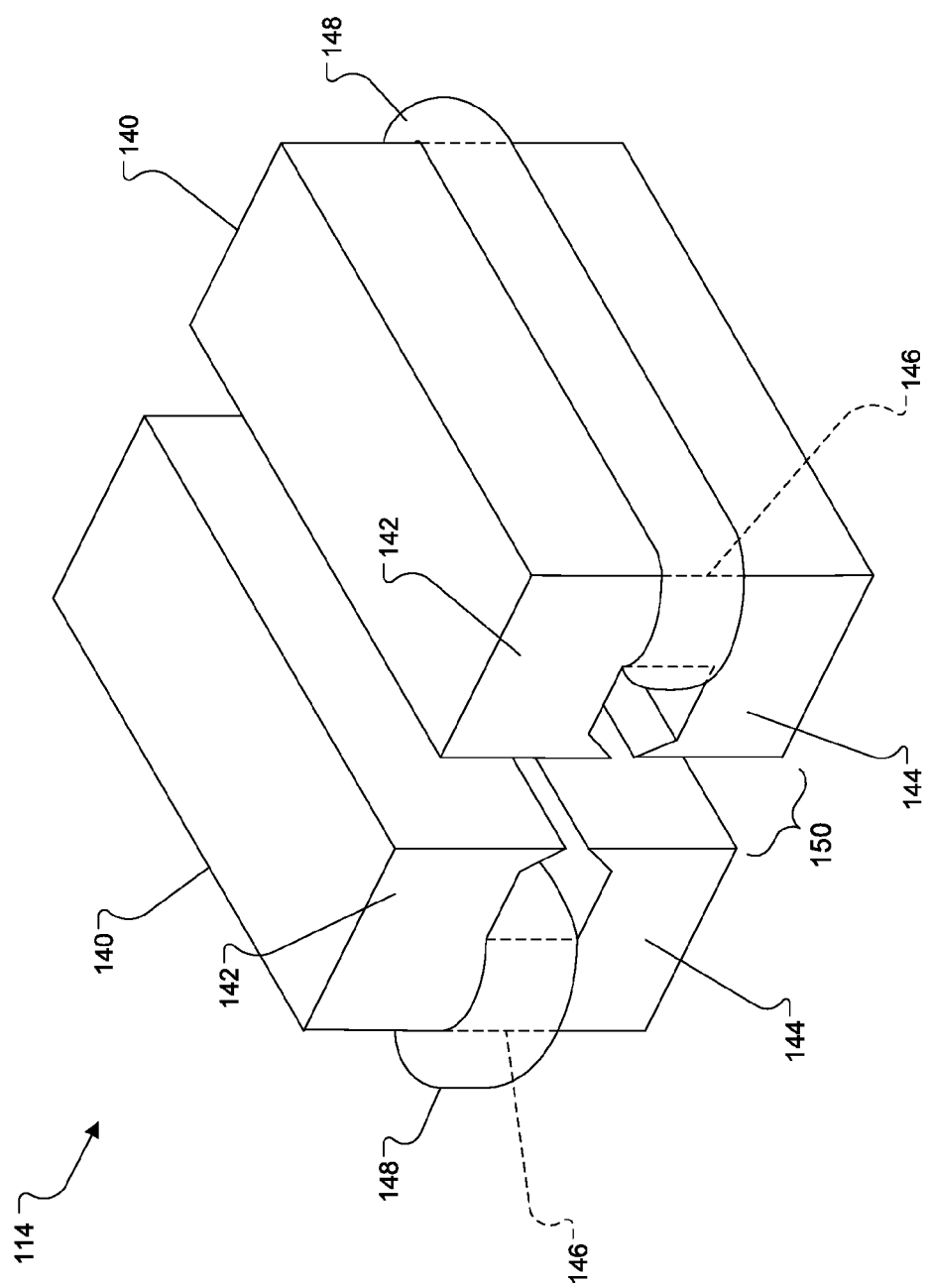
FIG. 3 is a perspective view of the common stator of the loudspeaker of FIG. 1A.
Figure 4A:
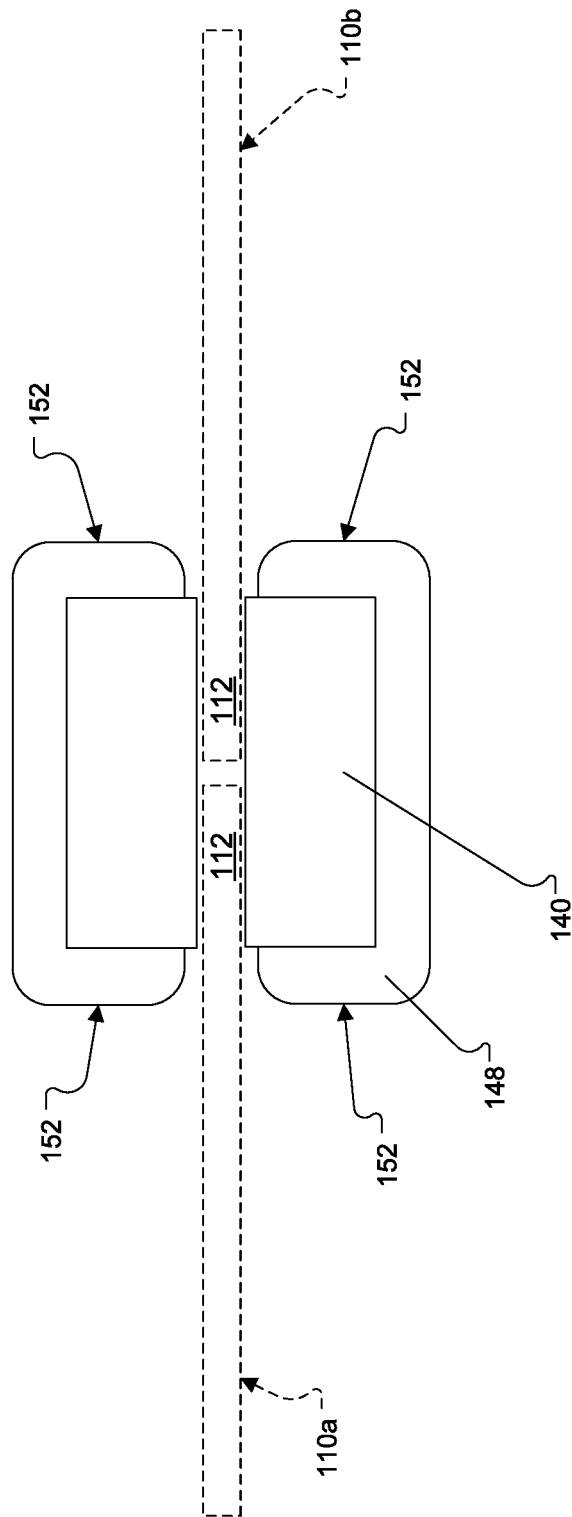
FIG. 4A is a top view of the common stator of FIG. 3.

An exemplary implementation of the stator 114 is illustrated in FIGS. 3 and 4A. As shown in FIGS. 3 and 4A, the stator 114 includes a pair of U-shaped cores 140 of high magnetic permeability material, such as soft iron. Each core 140 includes a first leg 142, a second leg 144, and a back portion 146 that extends between the first and second legs 142, 144. The first leg 142, the second leg 144, and the back portion 146 can be formed as separate components that are fastened together or can be integrally formed out of a common piece of material. Each core 140 also includes a coil 148 of electrically conductive material wound about the back portion 146 of the associated core 140 between the first and second legs 142, 144. In this regard, the cores 140 are said to include a backside winding, which, by keeping the coils 148 out of the vertical stack-up of components, helps to provide the stator 114 with a low profile height for an overall lower profile loudspeaker 100. The cores 140 are arranged adjacent to each other and define an air gap 150 therebetween, which is substantially filled by the armatures 112. The air gap 150 is a single, common air gap that is shared by both armatures 112.

The coils 148 are arranged so that the magnetic fields produced by current flowing through them add constructively. Current in coils 148 produces a magnetic flux across the air gap 150. The magnetic flux interacts with the permanent magnets 113 of the armatures 112 to drive the motion of the acoustic diaphragm 102. The combination of the armatures 112, the cores 140, and the coils 142 form a moving magnet motor. The interaction of the magnetic field in the air gap 150 due to current flowing in the coils 148 and magnetic fields of the magnets 113 apply force to the magnets 113 in a non-contact manner. Force from the magnets 113 is coupled structurally to the levers 110a, 110b and ultimately to the acoustic diaphragm 102.

Figure 4B:
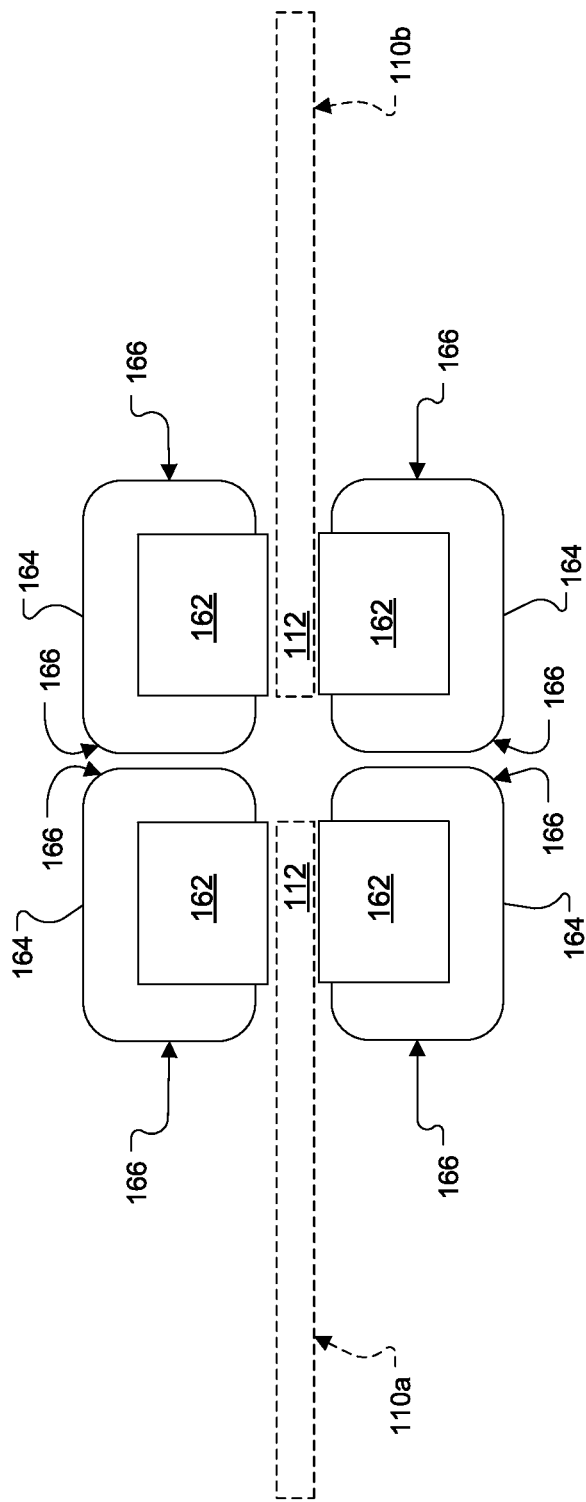
FIG. 4B is a top view of a multi-stator arrangement for comparison with the implementation shown in FIG. 4A.

For purposes of comparison, FIG. 4B illustrates an alternative, multi-stator arrangement in which a pair of stators 160 are arranged so as to drive two levers. In comparison to this multi-stator design (FIG. 4B), the common stator 114 (FIG. 4A) offers a simpler design. Even though the cores 140 may be longer than the individual cores 162 of the multi-stator arrangement, the common stator 114 reduces the total number of coils which can provide a design that is not only easier to manufacture (e.g., because of the reduction in parts) but which can also offer overall lower electrical resistance, and better magnetic performance.

Comparing FIGS. 4A and 4B, the common stator 114 of FIG. 4A reduces the number of coils (i.e., two coils 148 in the arrangement of FIG. 4A vs. four coils 164 in the arrangement of FIG. 4B), which can help to reduce the overall resistance since wrapping two coils results in an overall shorter path length (despite the longer core length in the common stator arrangement) than the wrapping of four coils. That is, while the common stator 114 is larger than each of the individual stators of the multi-stator arrangement for a given output, the perimeter around the larger stator is shorter than the sum of the perimeters around the two smaller stators. As a result, less wire is used in the common stator arrangement. The additional wire in the two stator arrangement adds resistance, inductance, weight, and cost.

The number of end turns is also reduced (i.e., four coil end turns 152 in the arrangement of FIG. 4A vs. eight coil end turns 166 in the arrangement of FIG. 4B). This can provide for improved magnetic performance since the magnetic flux associated with the end turns do to not couple as well into the core as does the flux associated with the interior turns of the coils. Consequently, a significant amount of the magnetic flux from the end turns does not pass through the magnet and, thus, adds leakage inductance without driving the armatures 112. This in turn means it takes more amplifier power to produce the same motor power. Reducing the number of ends turns can help to reduce this inefficiency.

The common stator arrangement also offers a better utilization of space. More specifically, in the two stator arrangement of FIG. 4B, there is additional space that is taken up by clearance(s) between the adjacent stators 160, which is not required in the common stator arrangement of FIG. 4A. As a result, the common stator arrangement can leave more space for accommodating other elements, such as allowing for longer levers 110a, 110b.

Figure 5:
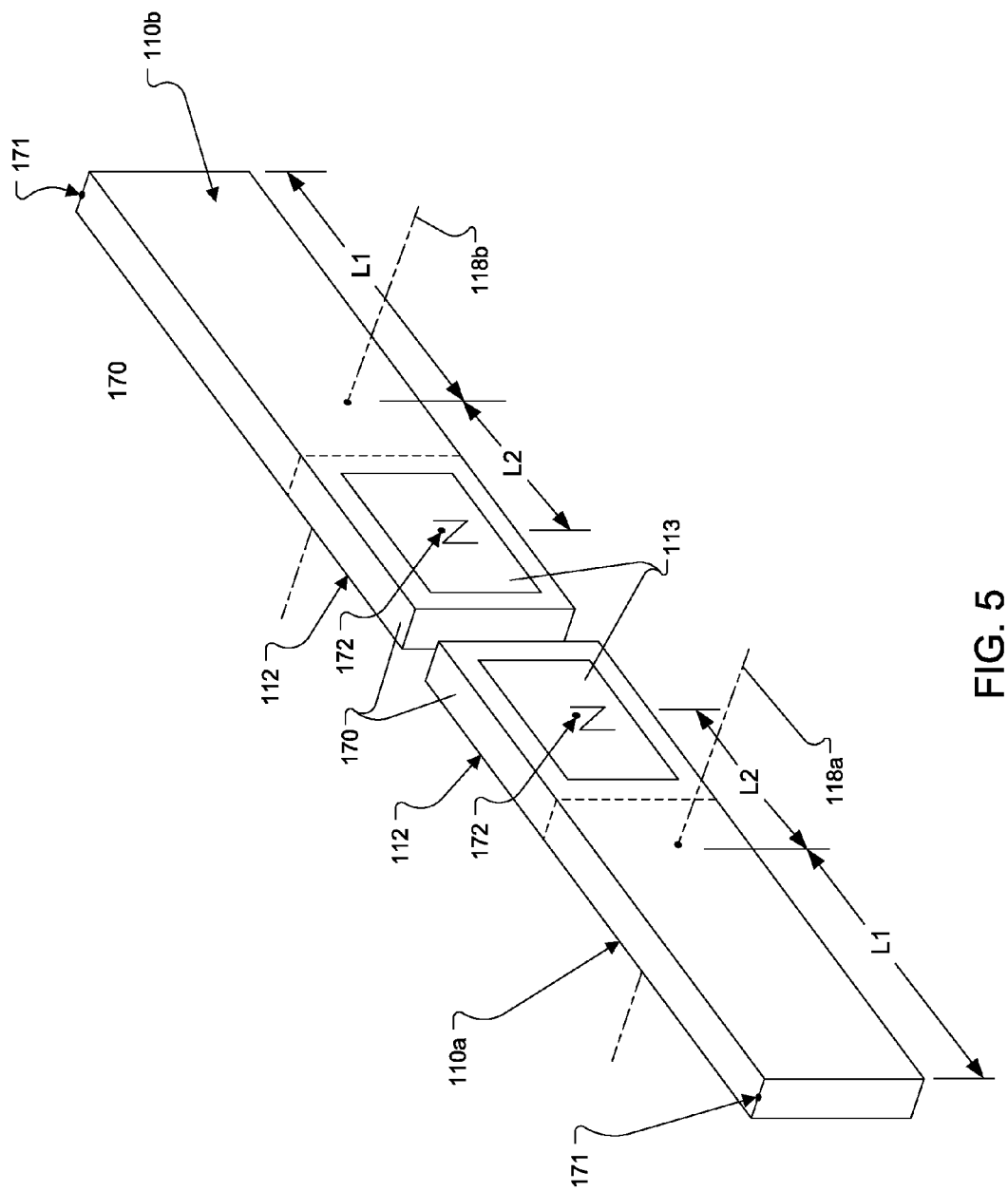
FIG. 5 is a perspective view of a pair of levers which support the armatures of the loudspeaker of FIG. 1A.

As shown in FIG. 5, each of the armatures 112 includes a magnet carrier 170 which supports the permanent magnet 113. The magnets 113 can be secured in their respective magnet carriers 170 with an adhesive, a mechanical interface, snap features, mold in place, or combinations thereof, etc. The levers 110a, 110b can be formed of a metal, such as aluminum; a glass-filled plastic; or other suitable low mass high stiffness materials. In some cases, the magnet carrier 170 is formed integrally with the associated lever 110a, 110b.

The magnets 113 are arranged such that like poles (north poles shown in FIG. 5) face the same core 140 of the stator 114, such that the magnets 113 are polarized in the same direction in the air gap 150. In some cases, the magnets 113 are arranged in an underhung configuration where the magnets 113 are shorter than the depth of the air gap 150 in the z-direction (z-axis shown in FIG. 1B). In some applications, the magnets 113 overshoot the air gap 150 at the extreme upward and extreme downward positions of the acoustic diaphragm 102. In some cases, the magnets 113 are also overhung a distance (d3), e.g., about half the width of the air gap 150, along the x-axis (shown in FIG. 1B) to catch fringe flux.

Referring to FIG. 5, each of the levers 110a, 110b includes a diaphragm attachment point 171 (the lever resistance), where the lever is attached to the diaphragm (e.g., via a connector 126 (FIG. 2A)). The attachment point 171 is positioned a lever length L1 away from the pivot axis 118a, 118b (the lever fulcrum). Each of the levers 110a, 110b also has an associated force application point 172 (i.e., a point where force is effectively applied from the associated armature 112), which represents the lever effort. In the illustrated example, the force application point 172 is approximated at the center of the magnet 113. The force application point 172 is positioned a lever length L2 away from the pivot axis 118a, 118b.

Generally, it can be preferable to minimize the angle of rotation of the lever 110a, 110b. Since the stroke is approximately the product of the angle of rotation of the lever 110a, 110b (in radians) and the lever length L1, gaining length reduces the angle of rotation needed to achieve the same stroke. At very small angles, e.g., less than 0.15 radians, the non-linearity of force-to-stroke is small enough to be negligible, but as the angle of rotation increases non-linearity of force-to-stroke can start to introduce harmonic distortion issues.

The gear ratio L1/L2 can be set to optimize the application. In some situations it may be better to raise the gear ratio to lower effective magnet mass relative to the cone. This might be the case if the cone pressure is low (e.g., infinite baffle applications). On the other hand it might be better to lower the gear ratio if the cone pressure load is high. (e.g., small sealed box applications)

Other Implementations

Figure 6A:
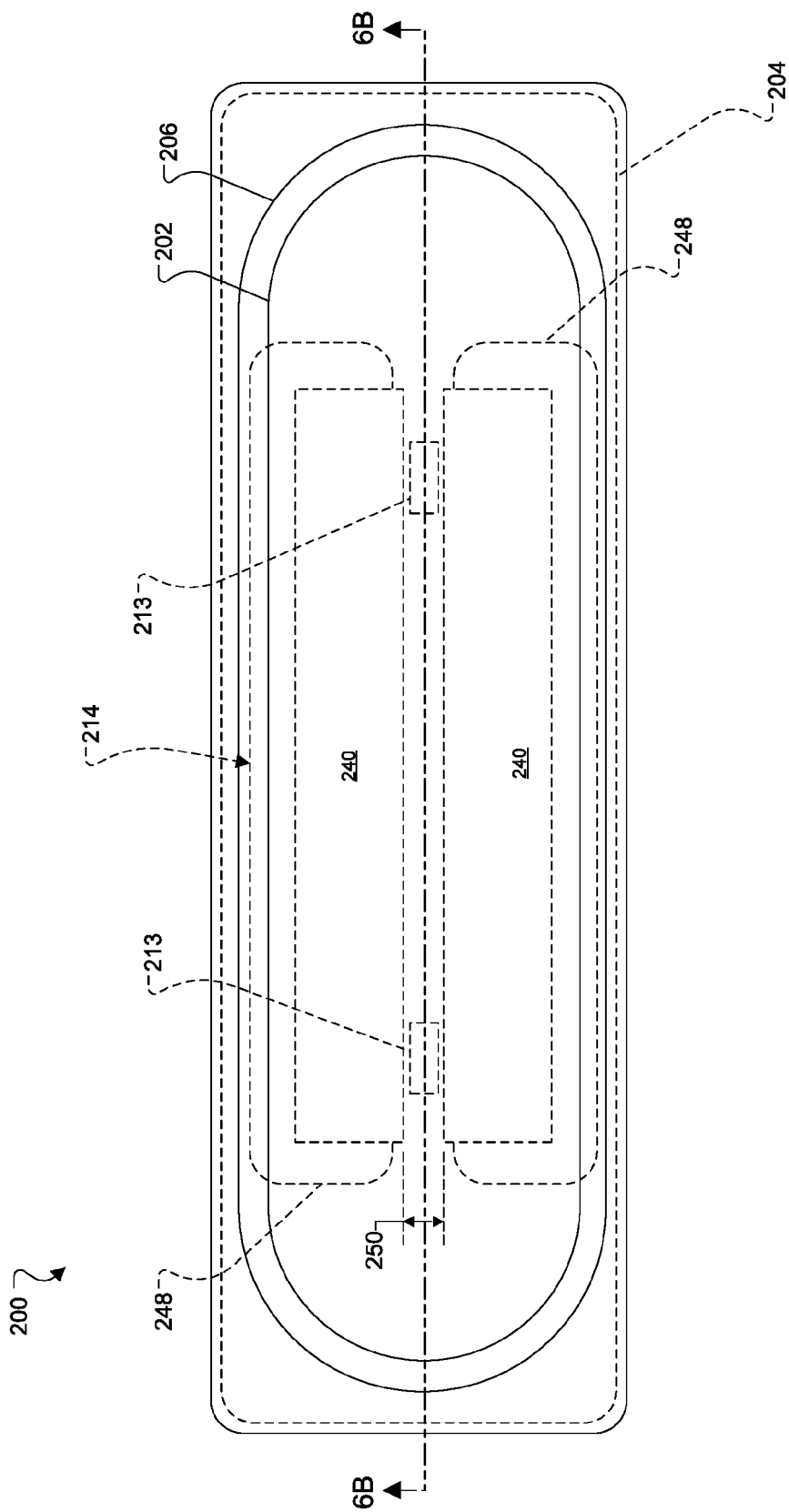
FIG. 6A is a top plan view of another implementation of a loudspeaker that employs a moving magnet motor which includes a single, common stator for driving a pair of armatures in a linear motion.
Figure 6B:
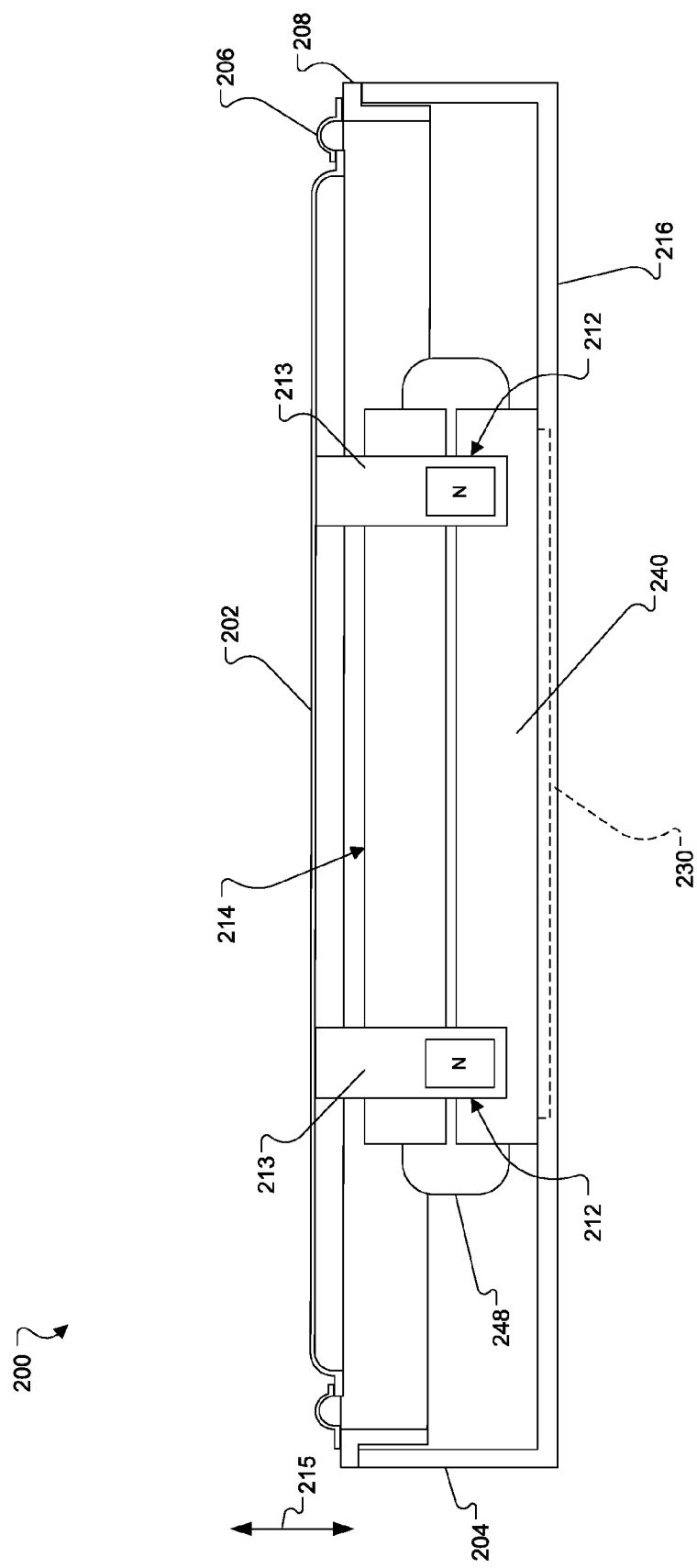
FIG. 6B is a cross-sectional side view of the loudspeaker of FIG. 6A, taken along line 6B-6B.

Although a few implementations have been described in detail above, other modifications are possible. For example, while an implementation of a loudspeaker has been described in which a common stator is arranged to drive a pair of armatures in an arcuate, oscillatory motion, in some instances, a common stator may be utilized to drive multiple armatures in a linear motion. For example, FIGS. 6A and 6B illustrate an implementation in which a loudspeaker 200 includes an acoustic diaphragm 202 that is mounted to an enclosure 204 by a surround 206 (e.g., via a frame 208). The loudspeaker 200 also includes a pair of armatures 212 each of which includes a permanent magnet and each of which is coupled to the acoustic diaphragm 202 via an associated connecting arm 213 for transmitting motion of the armatures 212 to the acoustic diaphragm to cause the acoustic diaphragm 202 to move, relative to the enclosure. The connecting arms 213 can be formed of a metal, such as aluminum; or a glass-filled plastic. The connecting arms 213 can be connected to the diaphragm with an adhesive.

Both of the armatures 212 are driven by the single, common stator 214, which provides a magnetic flux for both of the armatures to interact with, thereby to drive motion of the acoustic diaphragm. The armatures 212 and the stator 214 are positioned beneath the acoustic diaphragm 202 and are within the footprint, as defined by the outer peripheral edge, of the acoustic diaphragm 202. The stator 214 drives the armatures 212 in a linear, up-and-down motion (as indicated by arrow 215), which, in turn, drives the acoustic diaphragm 202 in a pistonic motion.

The stator 214 can have a structure as described above with regard to FIG. 3. More specifically, the stator 214 can include a pair of U-shaped cores 240 of high magnetic permeability material, such as soft iron. Each core 240 carries a coil 248 of electrically conductive material wound about a back portion of the associated core 240. The cores 240 are arranged adjacent to each other and define an air gap 250 therebetween, within which the armatures 212 are disposed. The air gap 250 is a single, common air gap that is shared by the armatures 212. In such cases, a suspension such as flexure (not shown) can be used to keep the magnets centered between the cores 240 of the stator 214 to inhibit the armatures 212 from crashing into the stator 214.

The coils 248 are connected (e.g., in series) and polarized so that the magnetic fields produced by current flowing through them add constructively. Current in coils 248 produces a magnetic flux across the air gap 250. The magnetic flux interacts with the armatures 212 to drive the motion of the acoustic diaphragm 202.

In the illustrated example, the stator 214 is secured to a bottom wall 216 of the enclosure 204 (e.g., with an adhesive). To accommodate the downward motion of the armatures 212, a recess 230 may be provided in the bottom wall 216 of the enclosure 204 to afford greater clearance.

Figure 7:
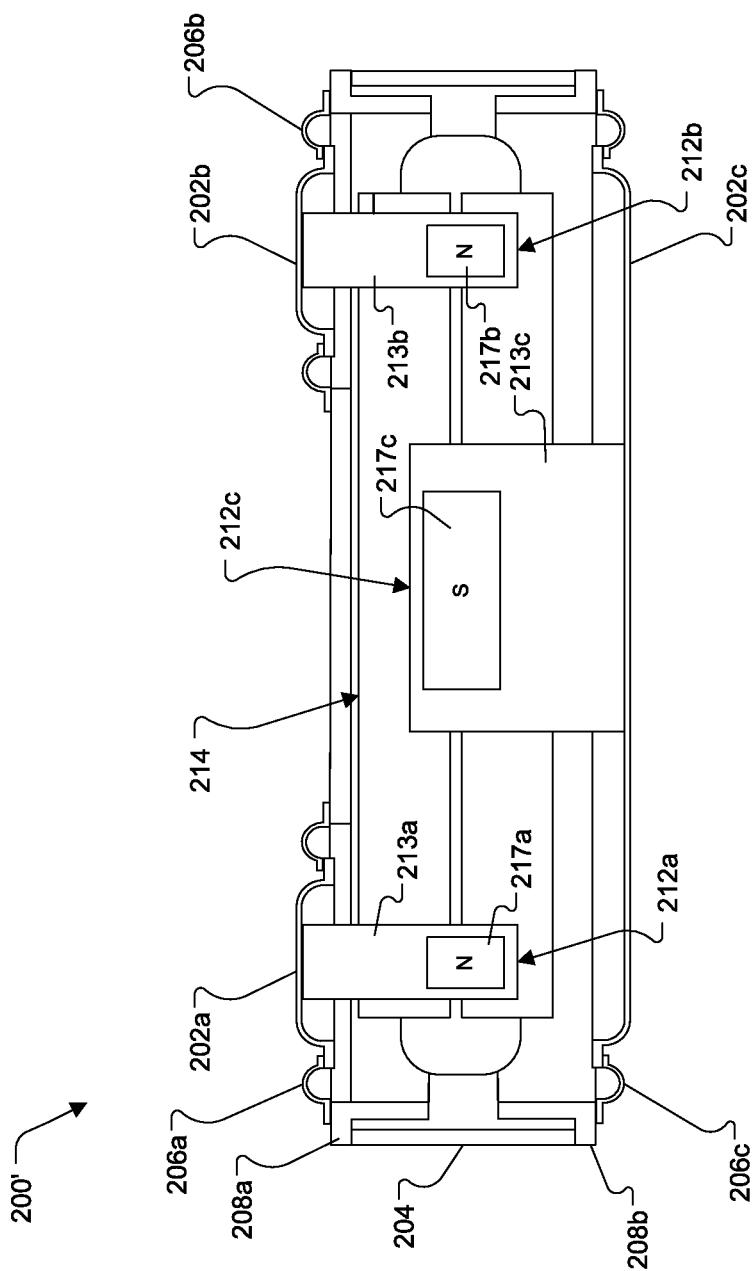
FIG. 7 is a cross-section side view of a loudspeaker that employs a moving magnet motor which includes a single, common stator that is capable of driving more than two armatures which drive respective loads.

In some cases, the common stator can be used to drive more than two armatures. Alternatively or additionally, multiple armatures may be employed to drive multiple loads. For example, FIG. 7 illustrates an implementation of an apparatus (e.g., a loudspeaker 200') in which the common stator 214 (which can have a structure as described above with regard to FIG. 3) is used to drive pistonic, oscillatory motion of three armatures 212a, 212b. 212c, each of the armatures 212a, 212b, 212c being coupled to a separate load (e.g., separate acoustic diaphragms 202a, 202b, 202c) via an associated connecting arm 213a, 213b, 213c. In such cases, a suspension such as flexure (not shown) can be used to keep the magnets centered between the cores 240 of the stator 214 to inhibit the armatures 212a, 212b, 212c from crashing into the stator 214.

In the example illustrated in FIG. 7, two of the acoustic diaphragms 202a, 202b are arranged along a first side of the loudspeaker 200' and are mounted to an enclosure 204, which may be metal, plastic, or other suitable material, by respective surrounds (i.e., first and second surrounds 206a, 206b). In the illustrated example, the surrounds 206a, 206b are mounted to the enclosure 204 via a first frame 208a. That is, the surrounds 206a, 206b are mounted to the first frame 208a and the first frame 208a is connected to the enclosure 204. A third one of the acoustic diaphragms 202b is arranged along an opposite, second side of the loudspeaker 200' and is mounted to the enclosure 204 via a second frame 208b. The second frame 208b may be separate from, coupled to, or integral with the first frame 208a.

Each of the armatures 212a, 212b, 212c includes a permanent magnet 217a, 217b, 217c. The common stator 214 provides a magnetic flux for the permanent magnets 217a, 217b, 217c to interact with, thereby to drive motion of the acoustic diaphragms 202a, 202b, 202c. The stator 114 can be secured to the enclosure 204 and/or to one or both of the frames 208a, 208b.

The magnet 217c of the center armature 212c is positioned such that its polarity is opposite that of the outer two armatures 212a, 212b so that the center acoustic diaphragm 202c is driven in a direction that is opposite to a direction that the outer two acoustic diaphragms 202a, 202b are driven. This can help to balance forces applied to the loudspeaker 200'.

Figure 8A:
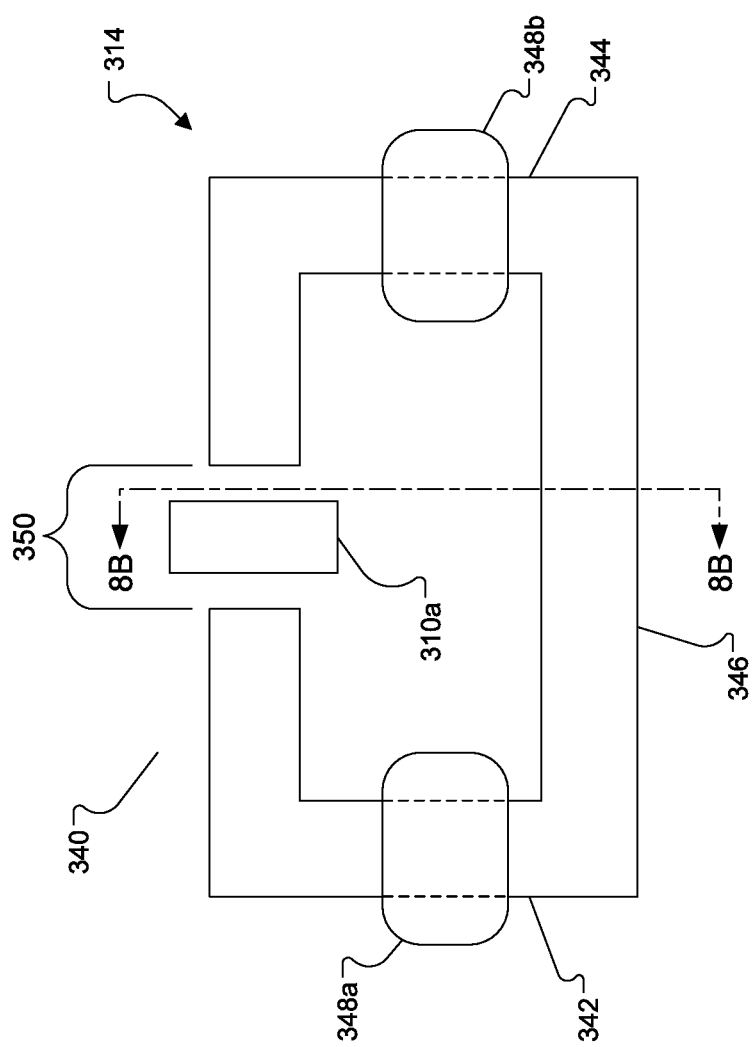
FIG. 8A is a front view of an alternative implementation of a moving magnet motor (shown with a lever arm in an air gap of the motor) that can be employed with the loudspeaker of FIG. 1A and/or the loudspeaker of FIG. 6A.
Figure 8B:
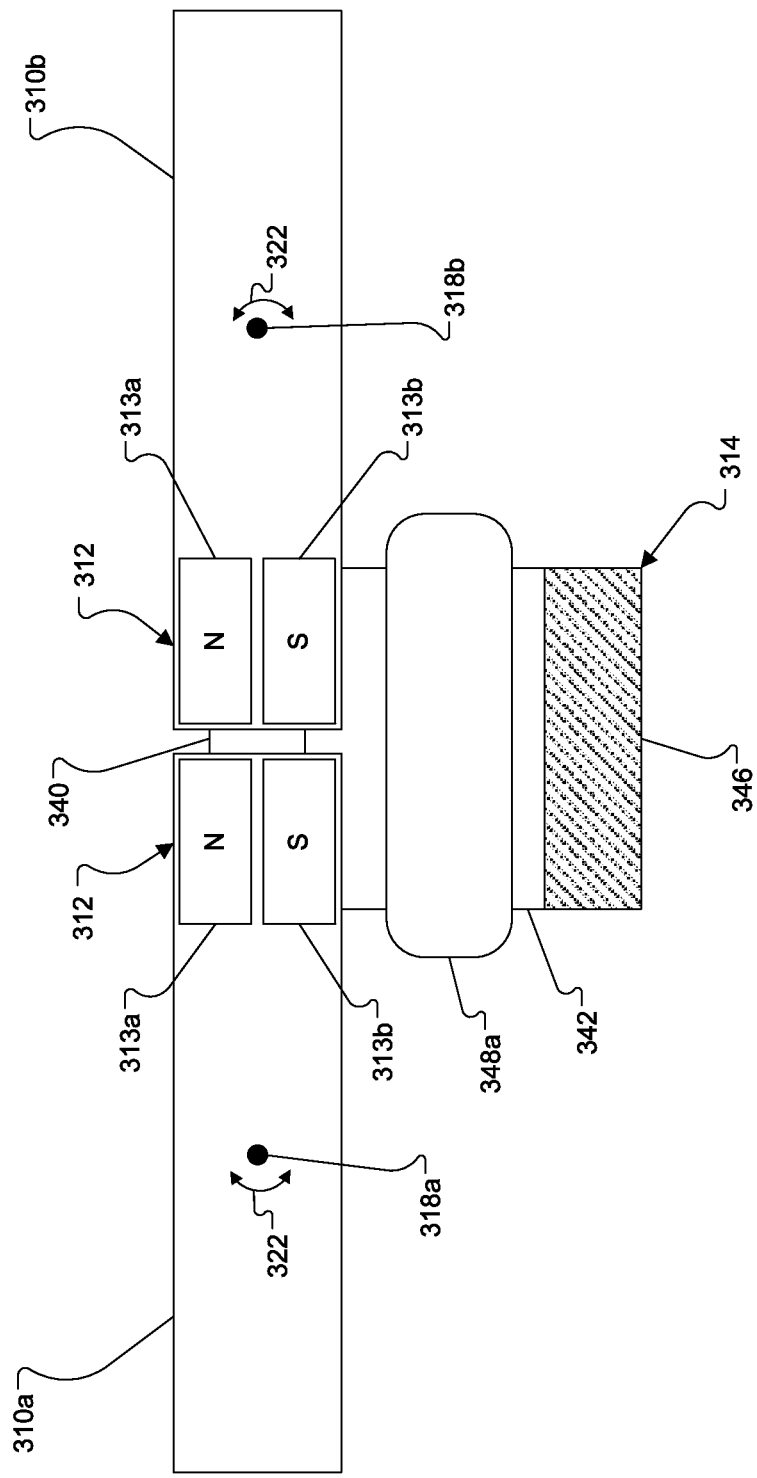
FIG. 8B is cross-sectional side view of the moving magnet motor of FIG. 8A (shown with a pair of lever arms in the air gap), taken along line 8B-8B.

FIGS. 8A and 8B illustrate another implementation of a moving magnet motor having a common stator for driving plural armatures that can be used, e.g., in the loudspeakers of FIGS. 1A and 6A. The stator 314 of FIGS. 8A and 8B includes a single C-shaped core 340 of high magnetic permeability material, such as soft iron. The core 340 includes a first leg 342, a second leg 344, and a connecting portion 346 that extends between the first and second legs 342, 344. The core 340 carries a first coil 348a of conducting material wound about the first leg 342 and a second coil 348b of conducting material wound about the second leg 344. The first and second legs 342, 344 define an air gap 350 therebetween, within which armatures 312 (FIG. 8B) can be disposed. The air gap 350 is a single, common air gap that is shared by the armatures 312. The armatures 312 are each coupled to one of a pair of levers 310a, 310b, e.g., for transmitting arcuate motion (arrows 322) of the armatures 312 (about pivot axes 318a, 318b) to a load (not shown) such as an acoustic diaphragm attached to the ends of the levers 310a, 310b opposite the armatures 312. In this implementation, the armatures 312 each include a pair of magnets 313A, 313B having reversed polarity of magnetization. The coils 348a, 348b are connected and polarized so that the magnetic fields produced by current flowing through them add constructively. Current in coils 348a, 348b produces a magnetic flux across the air gap 350. The magnetic flux interacts with the armatures 312 to drive the motion of the acoustic diaphragm.

Figure 9A:
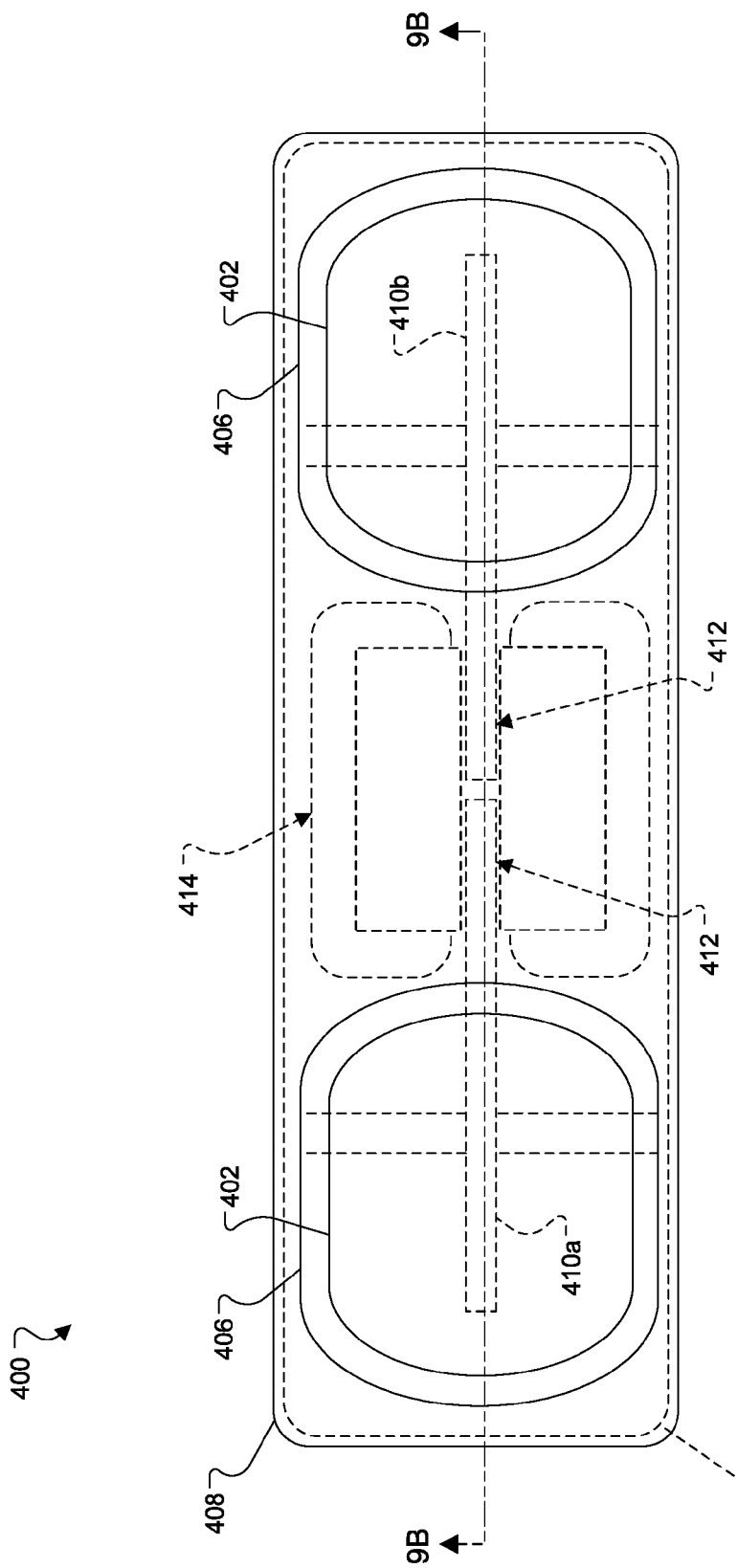
FIG. 9A is a top plan view of a loudspeaker that employs a moving magnet motor which includes a single, common stator for driving a pair of armatures, each of which drives a separate diaphragm.
Figure 9B:
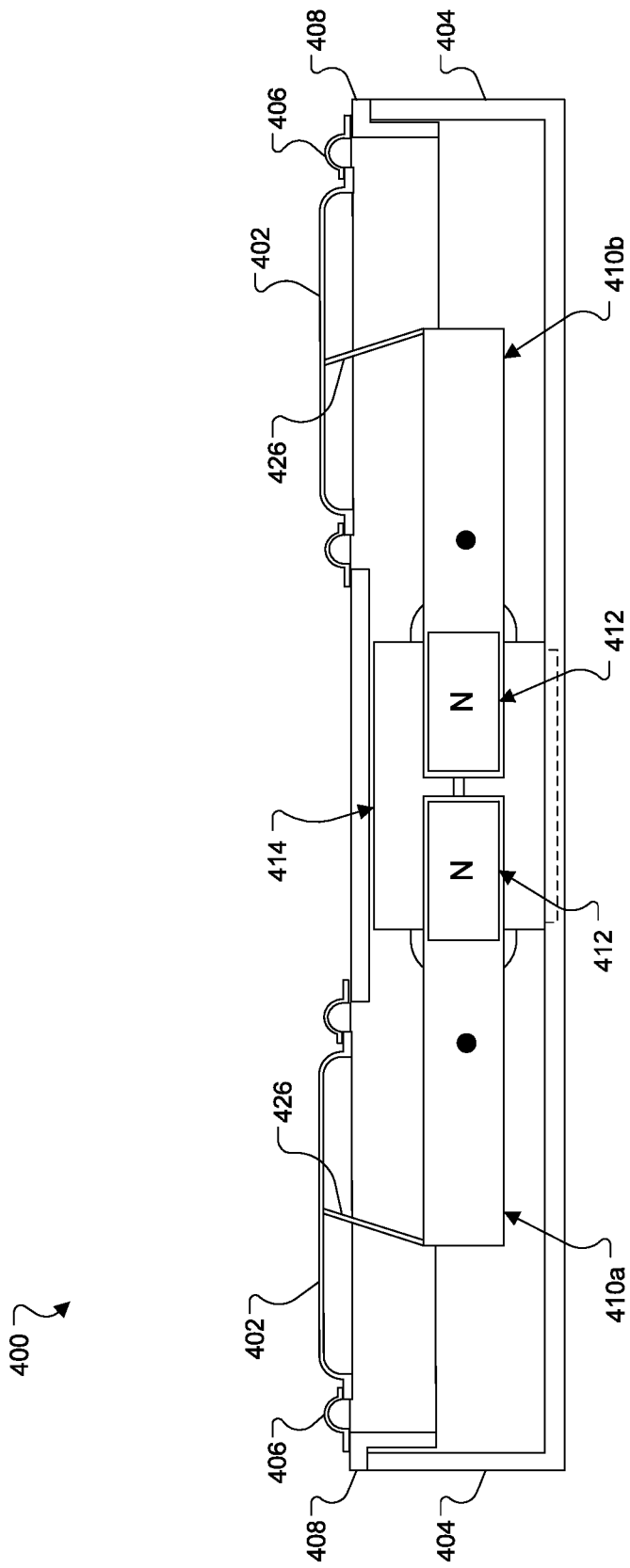
FIG. 9B is a cross-sectional side view of the loudspeaker of FIG. 9A, taken along line 9B-9B.

While an implementation of an apparatus (e.g., a loudspeaker) has been described in which a single, common stator is employed to drive plural levers, which, in turn, drive a common mechanical load (e.g., a loudspeaker), in some implementations, a common stator may be employed to drive plural levers, each of which drive a separate load. For example, FIGS. 9A and 9B illustrate an implementation of a loudspeaker 400 that includes a pair of acoustic diaphragms 402 each of which is mounted to an enclosure 404 (e.g., via a frame 408) by an associated surround 406. The loudspeaker 400 includes a pair of levers (i.e., first and second levers 410a, 410b) each of which couple an associated armature 412 to one of the acoustic diaphragms 402, via connectors 426, for transmitting motion of the armatures 412 to the acoustic diaphragms 402 to cause the acoustic diaphragms 402 to move, relative to the enclosure 404. Notably, both of the armatures 412 are driven by a single, common stator 414, which provides a magnetic flux for both of the armatures 412 to interact with, thereby to drive motion of the acoustic diaphragm 402. The stator 414 can have a structure as described above with regard to FIG. 3.

Figure 10A:
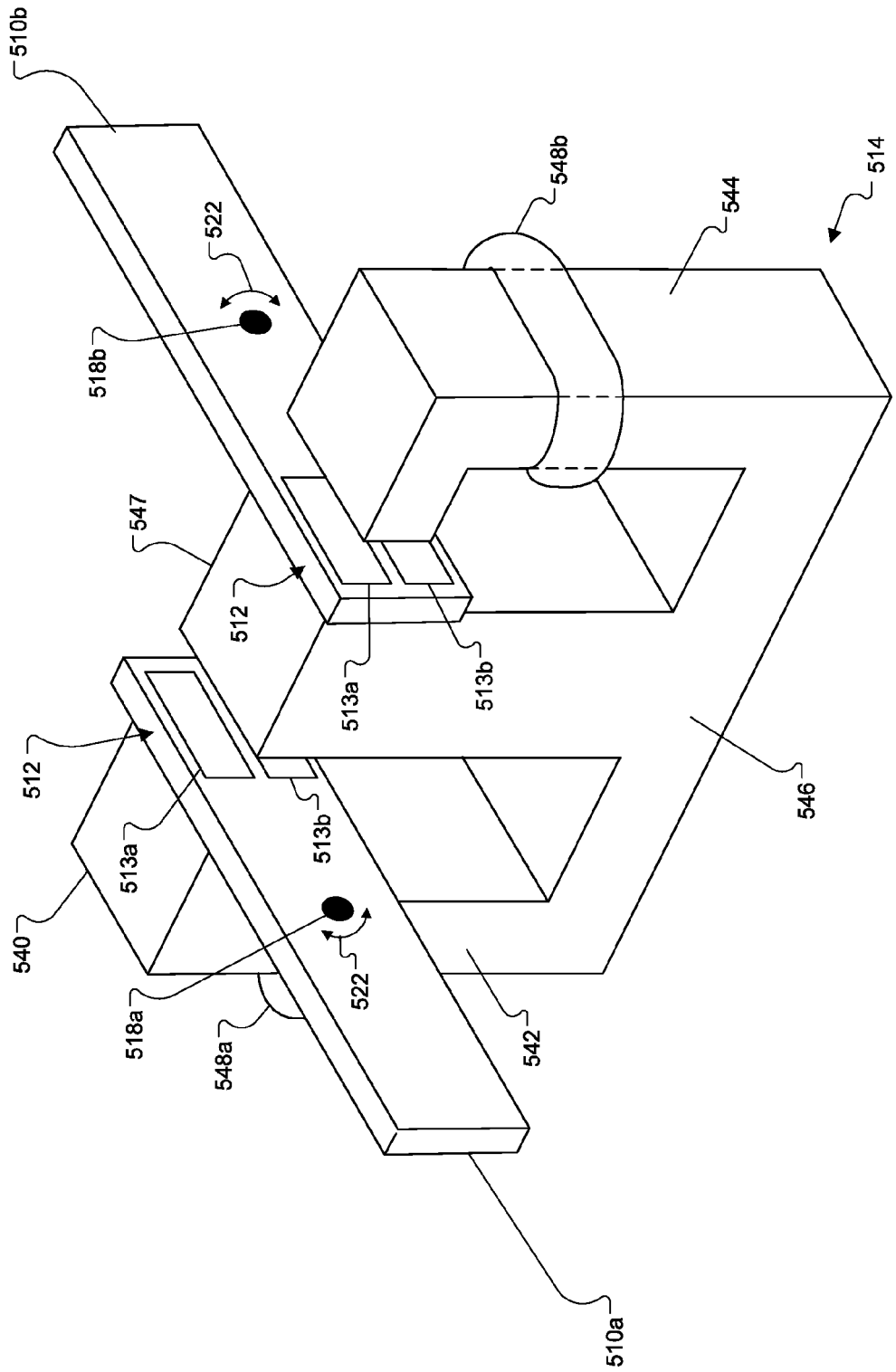
FIG. 10A is a perspective view of another implementation of a moving magnet motor having a common stator that defines plural air gaps (shown with levers in the air gaps).
Figure 10B:
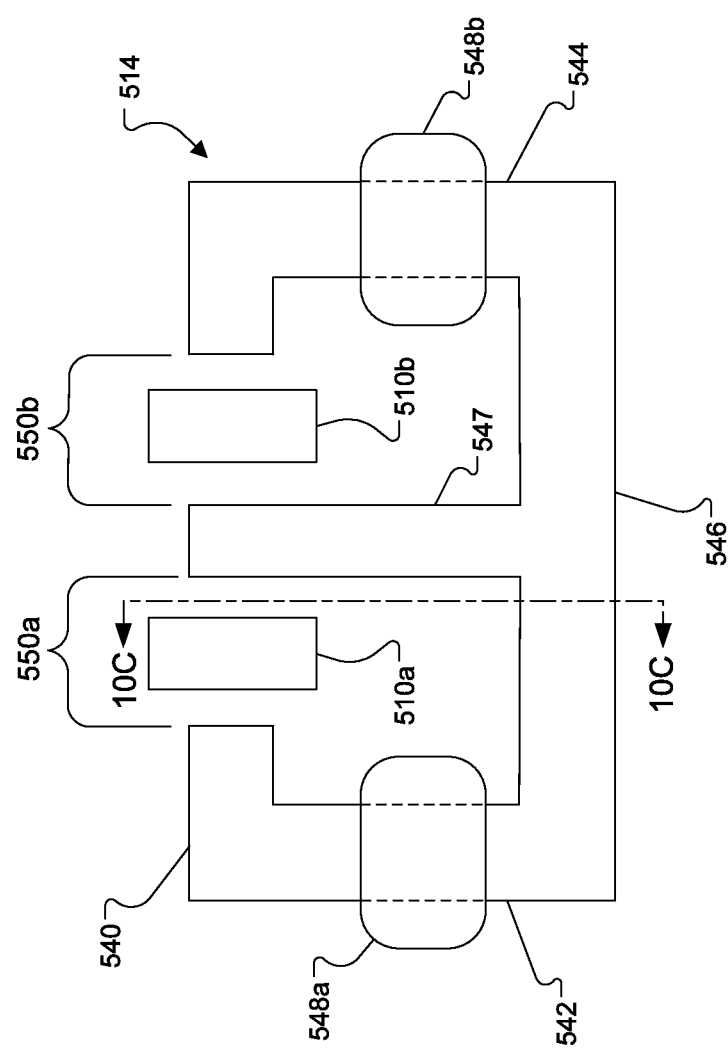
FIG. 10B is a front view of the moving magnet motor of FIG. 10A.
Figure 10C:
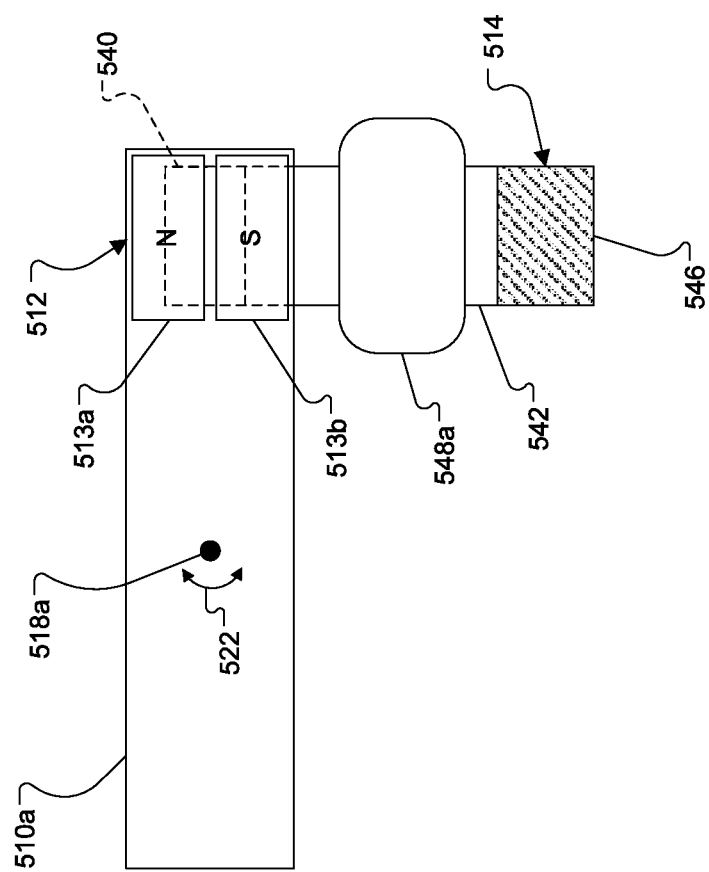
FIG. 10C is a cross-sectional side view of the moving magnet motor of FIG. 10B, taken along line 10C.

FIGS. 10A, 10B, and 10C illustrate yet another implementation of a moving magnet motor having a common stator for driving plural armatures that can be used, for example, in the loudspeakers discussed above. The stator 514 of FIGS. 10A-10C includes a single core 540 of high magnetic permeability material, such as soft iron. The core 540 includes a first leg 542, a second leg 544, and a connecting portion 546 that extends between the first and second legs 542, 544. The core 540 carries a first coil 548a of conducting material wound about the first leg 542 and a second coil 548b of conducting material wound about the second leg 544.

A center leg 547 extends upwardly from the connecting portion 546 into a region between the first and second legs 542, 544 to define a pair of air gaps 550a and 550b (FIG. 10B) therebetween. The moving magnet motor includes a pair of armatures 512 each of which is disposed in an associated one of the air gaps 550a, 550b. The armatures 512 are each coupled to one of a pair of levers 510a, 510b, e.g., for transmitting motion of the armatures 512 to a load (not shown) such as an acoustic diaphragm attached to the ends of the levers 510a, 510b opposite the armatures 512. The armatures 512 each include a pair of magnets 513A, 513B having reversed polarity of magnetization.

The levers 510a, 510b are arranged to pivot about pivot axes 518a, 518b. The interaction of the magnetic fields in the air gaps 550a, 550b due to current flowing in the coils 548a, 548b and magnetic fields of the magnets 513a, 513b drive the levers 510a, 510b in arcuate motions (arrows 522) of opposite directions relative to each other.

Although implementations have been described in which a moving magnet motor that utilizes a common stator to drive multiple armatures is employed for controlling displacement of an acoustic diaphragm in a loudspeaker, such moving magnet motors can be employed in other apparatus. For example, a moving magnet motor that utilizes a common stator to drive multiple armatures may be employed for controlling displacement of a diaphragm in a diaphragm pump. Alternatively, such motors can be employed to drive a piston in a piston pump.

While implementations have been described which include first class lever arrangements (i.e., arrangements in which the pivot axis (the lever fulcrum) is intermediate the armature/force application point (the lever effort) and the diaphragm attachment point (i.e., the point of attachment between the lever and the diaphragm) which represents the lever resistance, other implementations are possible. For example, the levers can be arranged in a second class lever configuration in which the point of attachment between the lever and the diaphragm is intermediate the pivot axis and the armature.

Figure 11:
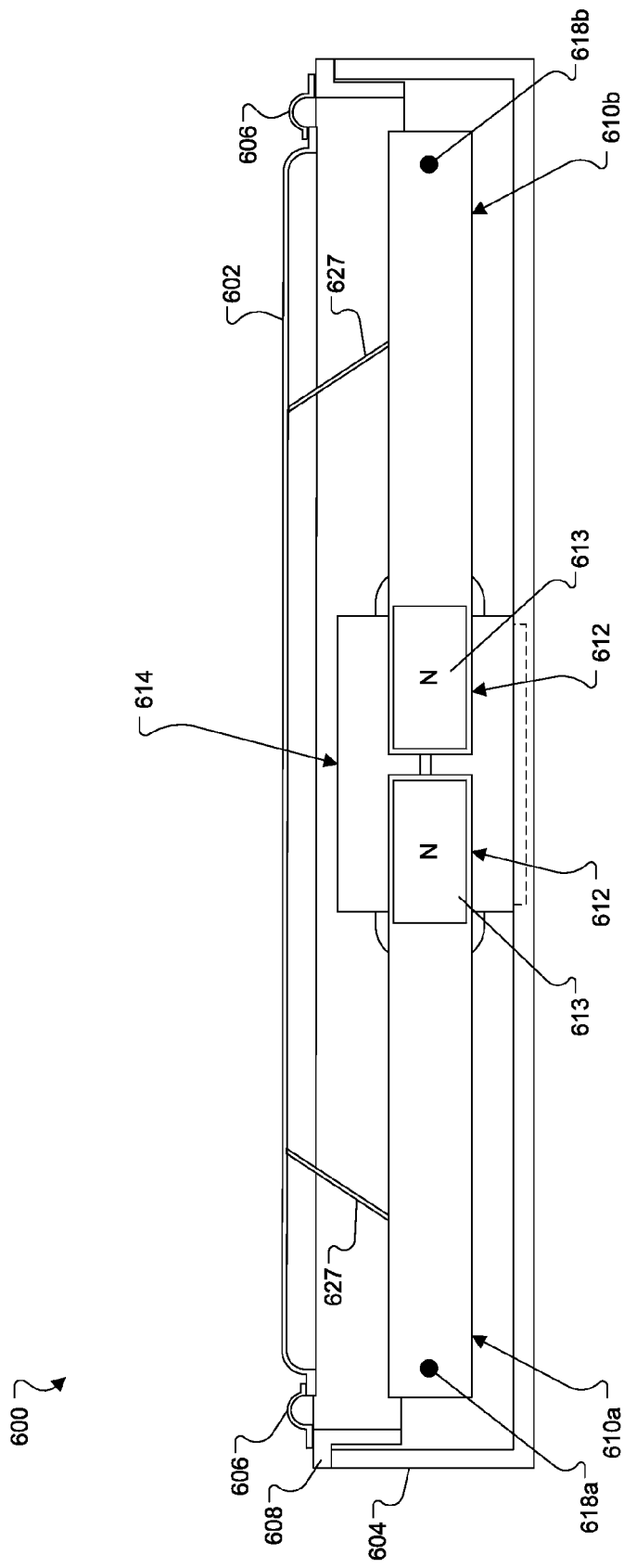
FIG. 11 is a cross-sectional side view of an implementation of a loudspeaker having levers arranged in a second class lever configuration.

FIG. 11 illustrates an exemplary apparatus (e.g., a loudspeaker 600) which implements a second class lever configuration. The loudspeaker includes an acoustic diaphragm 602 (a mechanical load), that is mounted to an enclosure 604 by a surround 606. The loudspeaker 600 also includes a pair of levers (i.e., first and second levers 610a, 610b) each of which couple an associated armature 612 to the acoustic diaphragm 602 for transmitting motion of the armatures 612 to the acoustic diaphragm to cause the acoustic diaphragm 602 to move, relative to the enclosure 604.

Each of the armatures 612 includes a permanent magnet 613. Once again, both of the armatures 612 are driven by a single, common stator 614, which provides a magnetic flux for the permanent magnets 613 of both of the armatures 612 to interact with, thereby to drive motion of the acoustic diaphragm. Each of the levers 610a, 610b is pivotally connected to a mechanical ground reference, such as the enclosure 604 or the frame 608 of the loudspeaker 600, such that the levers 610a, 610b move in an arcuate path about respective pivot axes 618a, 618b. Notably, the pivot axes 618a, 618b are intermediate the respective force application points (the armatures 612) and respective diaphragm attachment points 627.

A number of implementations have been described. Nevertheless, it will be understood that additional modifications may be made without departing from the spirit and scope of the inventive concepts described herein, and, accordingly, other embodiments are within the scope of the following claims.

What is claimed is:

1. An apparatus comprising:
    at least one load;
    a plurality of armatures each comprising a permanent magnet, the armatures being coupled to the at least one load to cause the at least one load to move; and
    a common stator defining an air gap within which the plurality of armatures is disposed, the common stator being configured for creating magnetic flux across the air gap for the permanent magnets of the armatures to interact with, thereby to drive motion of the permanent magnets, which, in turn, drive motion of the at least one load.

2. The apparatus of claim 1, wherein the stator comprises:
    at least one core of high magnetic permeability material defining the air gap within which the armatures reside; and
    a pair of coils wrapped around the at least one core for carrying current to generate magnetic flux across the air gap for the armatures to interact with.

3. The apparatus of claim 2, wherein the stator comprises no more than two coils.

4. The apparatus of claim 2, wherein the coils collectively include no more than four end turns.

5. The apparatus of claim 1, wherein the stator comprises:
    a pair of cores of high magnetic permeability material, the cores together defining the air gap; and
    a pair of coils, each coil wrapped around one of the cores for carrying current to generate magnetic flux across the air gap.

6. The apparatus of claim 1, wherein the plurality of armatures are configured to pivot about respective pivot axes.

7. The apparatus of claim 1, wherein the plurality of armatures are configured to move in a linear motion.

8. The apparatus of claim 1, comprising a pair of levers coupling the armatures to the at least one load for transmitting rotational motion of the armatures to the at least one load to cause the at least one load to move.

9. The apparatus of claim 1, wherein the levers are configured and arranged for rotation in opposite directions of rotation relative to each other.

10. The apparatus of claim 9, wherein the levers are arranged to move the at least one load in a pistonic motion.

11. The apparatus of claim 9, wherein the at least one load comprises an acoustic diaphragm.

12. The apparatus of claim 11, further comprising:
    an enclosure; and
    a surround connecting the acoustic diaphragm to the enclosure,
    wherein a bottom wall of the enclosure includes a recess, the recess being arranged and configured to accommodate downward motion of the armatures.

13. The apparatus of claim 12, wherein the stator is mounted to the bottom wall of the enclosure.

14. The apparatus of claim 11, wherein the acoustic diaphragm is displaceable between a fully extended position in which the acoustic diaphragm extends outwardly away from the enclosure, and a fully retracted position, in which the acoustic diaphragm is drawn inward towards enclosure, and
    wherein, in the fully retracted position, a lower edge of the acoustic diaphragm overlaps at least a portion of the armatures such that the armatures are at least partially tucked into the acoustic diaphragm.

15. The apparatus of claim 11, wherein the armatures and the stator are positioned adjacent to and completely within the footprint of the acoustic diaphragm.

16. The apparatus of claim 1, wherein the apparatus comprises a loudspeaker.

17. The apparatus of claim 1, wherein the armatures are configured to move relative to each other.

18. A method comprising:
    passing electrical current through coils of a common stator to generate magnetic flux across an air gap which a plurality armatures interact with causing the armatures to move, and thereby driving motion of at least one load coupled to the plurality of armatures,
    wherein each of the armatures comprises a permanent magnet, disposed within the air gap, which interacts with the magnetic flux, thereby to drive motion of the permanent magnets, which, in turn, drives the motion of the at least one load.

19. The method of claim 18, wherein driving motion of the at least one load comprises driving motion of an acoustic diaphragm.

20. The method of claim 18, wherein driving motion of the at least one load comprises driving the at least one load in a pistonic motion.

21. The method of claim 18, wherein driving motion of the at least one load comprises driving the plurality of armatures such that the armatures move relative to each other.

22. The method of claim 18, wherein driving motion of the at least one load comprises driving oscillatory, arcuate motion of a pair of levers.

23. The method of claim 22, wherein driving oscillatory, arcuate motion of the pair of levers comprises driving the levers in opposite directions of rotation relative to each other.

24. A loudspeaker comprising:
    an acoustic diaphragm;
    a first armature comprising a first permanent magnet;
    a first lever mechanically coupling the first armature and the acoustic diaphragm and configured such that motion of the first armature causes the first lever to pivot about a first pivot axis;
    a second armature comprising a second permanent magnet;
    a second lever mechanically coupling the second armature and the acoustic diaphragm and configured such that motion of the second armature causes the second lever to pivot about a second pivot axis; and
    a common stator for creating magnetic flux for the first and second permanent magnets of the first and second armatures to interact with, thereby to drive motion of the permanent magnets, which, in turn, drive motion of the acoustic diaphragm;

wherein the common stator defines an air gap within which the first and second armatures are disposed, and wherein the stator is configured to create magnetic flux across the air gap for the first and second armatures to interact with.

\* \* \* \* \*